May 3, 1932.  E. A. WATSON  1,856,364

ELECTRICAL LIQUID LEVEL INDICATING INSTRUMENT

Filed March 31, 1930

E. A. Watson
INVENTOR

By Maus & Glenn
ATTYS.

Patented May 3, 1932

1,856,364

UNITED STATES PATENT OFFICE

ERNEST ANSLEY WATSON, OF COVENTRY, ENGLAND, ASSIGNOR TO S. SMITH & SONS (MOTOR ACCESSORIES) LIMITED, OF LONDON, ENGLAND

ELECTRICAL LIQUID LEVEL INDICATING INSTRUMENT

Application filed March 31, 1930, Serial No. 440,458, and in Great Britain April 30, 1929.

A known kind of electrical liquid level indicating instrument, used for such purposes as a petrol gauge for motor vehicles, comprises a potentiometer device, the movable contact of which is actuated by a float. The magnetic field of the indicating instrument is provided by current passing through a pair of coils or windings. One of the windings is connected to the terminals of a battery, and the other winding is in series with the potentiometer contact, one end of this winding being also connected to one end of the other winding, or to one end of the battery. The effect of the two windings is to produce a directionally variable magnetic field to which the index of the indicating instrument is responsive. One of the difficulties encountered in the construction of instruments of this kind is that of making an inexpensive indicating instrument sufficiently sensitive to the float movements over a wide range, and the object of the present invention is to enable this difficulty in instruments of the kind above mentioned to be overcome in a very simple and convenient manner.

The invention comprises the combination of a field winding which is connected at its ends to the battery or other source of electromotive force, a field winding which is connected at one end to the movable contact of a potentiometer, the other end of this winding being connected to an intermediate part of the first winding, or of the battery, or of a resistance, in parallel with the battery, and a pivoted armature attached to an index and arranged in the common part of the magnetic field produced by the two windings.

In the accompanying sheet of explanatory drawings:—

Figure 1:
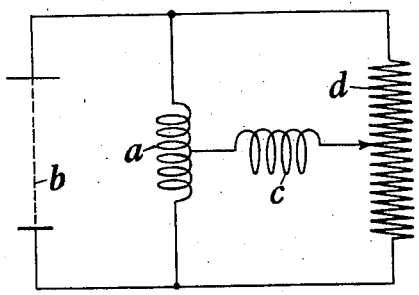
Figures 1, 2 and 3 are diagrams illustrating three different ways of carrying my invention into effect.

Referring to Figure 1, I employ any convenient indicating instrument in which the movement of an indicating finger is determined by directional changes in a magnetic field. In a moving-iron instrument the field is provided by current passing through a winding $a$ herein termed the main or control winding. The ends of this winding are connected to a battery $b$. To the center or any other suitable and convenient intermediate point of the control winding $a$ is connected another winding $c$ which is arranged in series with a contact which slides over a potentiometer $d$. By so connecting the winding $c$ to $a$, it becomes possible to obtain a reversal of current in the winding $c$ and consequently a much larger flux variation than is possible with the ordinary arrangement. Preferably the fluxes due to the two windings are superimposed at right angles, but this is not essential.

Figure 2:
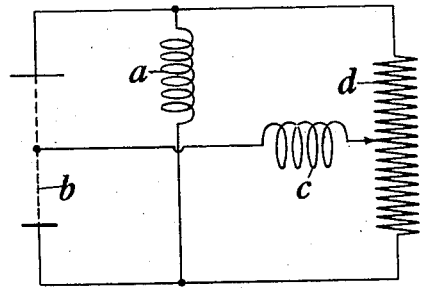
Figure 3:
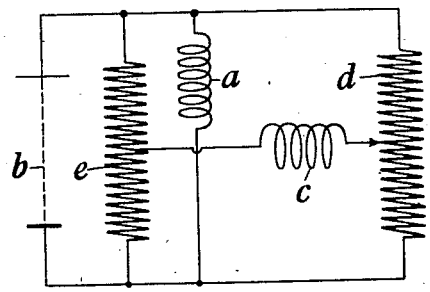

The same effect can be obtained in other ways. Referring to Figure 2, where the parts corresponding to those on Figure 1 are indicated by the same references, the coil $c$ instead of being connected to an intermediate part of the coil $a$ is connected to the middle or other convenient intermediate point of the battery $b$. Or as shown in Figure 3, a resistance $e$ may be employed, this being connected across the ends of the battery as shown, and one end of the winding $c$ is connected to an intermediate point of $e$.

By this invention I am able to provide a more sensitive indication of the potentiometer movements over a wider range than heretofore.

Though the invention is primarily intended for the petrol gauges of motor vehicles, it may be used for other like purposes in which it is required to measure a liquid depth.

Figure 4:
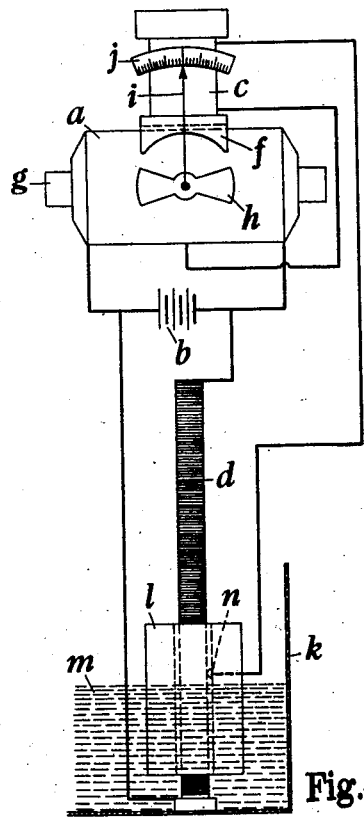
Figure 4 is a diagram illustrating a system operating in accordance with my invention.
Figure 5:
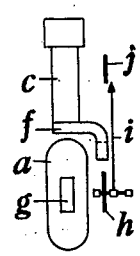
Figure 5 is a diagram showing a side view of the electromagnets and index.

A convenient arrangement of the windings illustrated diagrammatically at Figure 1 is shown in Figures 4 and 5. The winding $a$ is carried on a soft iron core $g$ and in that portion of the field which lies at one side of the winding is pivoted an armature $h$ carrying an index $i$ which moves relatively to a scale $j$. At one side of $a$ adjacent to the index is arranged the winding $c$ which is also carried on a soft iron core $j$. The armature lies in the field due to the two fluxes and takes up a position corresponding to the resultant of the two fluxes. Such an arrangement of the parts enables me to construct the indicating instrument in a very convenient form. The diagram at Figure 4 also shows one mode of using the instrument. Within a tank $k$ is fixed a potentiometer coil $d$ and around the coil is placed a float $l$ which rises and falls with the level of the liquid $m$ in the tank. A contact $n$ on the float cooperates with the potentiometer winding, and the movements of the float are accompanied by corresponding movements of the index $i$ in the measuring instrument.

Having thus described my invention what I claim as new and desire to secure by Letters Patent is:—

1. In electrical liquid level indicating instruments, a system comprising a pair of field windings adapted to produce two magnetic fields situated at an angle to each other, an armature movable in said fields, an index attached to the armature, a potentiometer, a contact movable along the potentiometer, a float carrying the contact, and a source of electromotive force, the ends of one of the field windings and of the potentiometer being connected to the source of electromotive force, and the ends of the other field winding being connected respectively to the potentiometer contact and to a point in the system which is at a potential intermediate to that of the ends of the first mentioned winding, substantially as described.

2. In electrical liquid level indicating instruments, a system comprising a pair of field windings adapted to produce two magnetic fields situated at right angles to each other, an armature movable in said fields, an index attached to the armature, a potentiometer, a contact movable along the potentiometer, a float carrying the contact, and a source of electromotive force, the ends of one of the field windings and of the potentiometer being connected to the source of electromotive force, and the ends of the other field winding being connected respectively to the potentiometer contact and to an intermediate point in the first mentioned winding, substantially as described.

3. In electrical liquid level indicating instruments, a system comprising a pair of field windings adapted to produce two magnetic fields situated at an angle to each other, an armature movable in said fields, an index attached to the armature, a potentiometer, a contact movable along the potentiometer, a float carrying the contact, and a source of electromotive force, the ends of one of the field windings and of the potentiometer being connected to the source of electromotive force, and the ends of the other field winding being connected respectively to the potentiometer contact and to an intermediate point in the first mentioned winding, substantially as described.

4. In apparatus as claimed in claim 1, the combination of a pair of field windings, a soft iron core in each winding, the parts producing a pair of magnetic fields at an angle to each other, an armature pivotally mounted in a common part of the two fields, and an index attached to the armature, substantially as described.

5. In combination, a system comprising a pair of field windings adapted to produce two magnetic fields situated at an angle to each other, an armature movable in said fields, an index attached to the armature, a potentiometer, a contact movable along the potentiometer, movable means carrying the contact, and a source of electromotive force, the ends of one of the field windings and of the potentiometer being connected to the source of electromotive force, and the ends of the other field winding being connected respectively to the potentiometer contact and to a point in the system which is at a potential intermediate to that of the ends of the first mentioned winding, substantially as described.

6. In combination, a system comprising a pair of field windings adapted to produce two magnetic fields situated at right angles to each other, an armature movable in said fields, an index attached to the armature, a potentiometer, a contact movable along the potentiometer, movable means carrying the contact, and a source of electromotive force, the ends of one of the field windings and of the potentiometer being connected to the source of electromotive force, and the ends of the other field winding being connected respectively to the potentiometer contact and to an intermediate point in the first mentioned winding, substantially as described.

7. In combination, a system comprising a pair of field windings, adapted to produce two magnetic fields situated at an angle to each other, an armature movable in said fields, an index attached to the armature, a potentiometer, a contact movable along the potentiometer, movable means carrying the contact, and a source of electromotive force, the ends of one of the field windings and of the potentiometer being connected to the source of electromotive force, and the ends of the other field winding being connected respectively to the potentiometer contact and to an intermediate point in the first mentioned winding, substantially as described.

8. In an apparatus as claimed in claim 5, the combination of a pair of field windings, a soft iron core in each winding, the parts producing a pair of magnetic fields at an angle to each other, an armature pivotally mounted in a common part of the two fields, and an index attached to the armature, substantially as described.

In testimony whereof I have signed my name to this specification.

ERNEST ANSLEY WATSON.